(12) United States Patent
Gardner et al.

(10) Patent No.: US 11,186,293 B2
(45) Date of Patent: Nov. 30, 2021

(54) METHOD AND SYSTEM FOR PROVIDING ASSISTANCE TO A VEHICLE OR DRIVER THEREOF

(71) Applicant: HERE Global B.V., Eindhoven (NL)

(72) Inventors: Roland Gardner, Naperville, IL (US); Chris Dougherty, Highland Park, IL (US); Gregg Bresnahan, Wheaton, IL (US)

(73) Assignee: HERE GLOBAL B.V., Eindhoven (NL)

( * ) Notice: Subject to any disclaimer, the term of this patent is extended or adjusted under 35 U.S.C. 154(b) by 599 days.

(21) Appl. No.: 16/002,677

(22) Filed: Jun. 7, 2018

(65) Prior Publication Data
US 2019/0375429 A1 Dec. 12, 2019

(51) Int. Cl.
| | |
|---|---|
| *B60W 50/14* | (2020.01) |
| *B60W 30/08* | (2012.01) |
| *B60W 40/04* | (2006.01) |
| *B60W 50/10* | (2012.01) |

(52) U.S. Cl.
CPC ............ *B60W 50/14* (2013.01); *B60W 30/08* (2013.01); *B60W 40/04* (2013.01); *B60W 50/10* (2013.01); *B60W 2050/146* (2013.01); *B60W 2556/50* (2020.02)

(58) Field of Classification Search
CPC ...... B60W 50/14; B60W 30/08; B60W 40/04; B60W 50/10; B60W 2556/50; B60W 2050/146
USPC ........................................................ 701/431
See application file for complete search history.

(56) References Cited

U.S. PATENT DOCUMENTS

| | | | |
|---|---|---|---|
| 8,903,610 B2* | 12/2014 | Chandy ................ | B62D 5/0463 |
| | | | 701/42 |
| 9,594,371 B1 | 3/2017 | Palmer et al. | |
| 9,776,563 B1 | 10/2017 | Be et al. | |
| 10,647,302 B2* | 5/2020 | Santiano ................ | H04W 4/022 |
| (Continued) | | | |

FOREIGN PATENT DOCUMENTS

| | | |
|---|---|---|
| DE | 102013019202 | 5/2015 |
| EP | 1726513 | 11/2006 |
| WO | WO 2017/017761 | 5/2018 |

OTHER PUBLICATIONS

Hareesh et al., "Vehicle Steering Shared Between Driver and Automated Control System to Prevent Accidents", Priyadarshini College of Engineering and Technology, vol. 1, Issue 9, dated Dec. 2014, pp. 23-30.

*Primary Examiner* — Paula L Schneider
(74) *Attorney, Agent, or Firm* — Alston & Bird LLP

(57) ABSTRACT

A method, system, and computer program product is provided for assisting a driver of the vehicle or providing guidance based on one or more geo-fences. The method comprises displaying one or more geo-fences super-imposed on a map display for a vehicle, wherein the one or more geo-fences comprises a tolerance zone; identifying a driving maneuver profile for the vehicle associated with the one or more geo-fences, and displaying the driving maneuver profile on the map display, wherein displaying the driving maneuver profile comprises: displaying a distance of the vehicle from the tolerance zone, and displaying a prohibited maneuver for the vehicle based on the one or more geo-fences and the distance of the vehicle from the tolerance zone.

19 Claims, 8 Drawing Sheets

(56) References Cited

U.S. PATENT DOCUMENTS

| | | | |
|---|---|---|---|
| 2005/0159883 A1* | 7/2005 | Humphries | B60R 25/102 |
| | | | 701/517 |
| 2010/0042940 A1* | 2/2010 | Monday | G09B 29/106 |
| | | | 715/764 |
| 2011/0235390 A1 | 9/2011 | Barwicz et al. | |
| 2011/0256881 A1* | 10/2011 | Huang | H04W 4/029 |
| | | | 455/456.1 |
| 2016/0180707 A1 | 6/2016 | Macneille et al. | |
| 2017/0259832 A1* | 9/2017 | Lathrop | B60W 50/14 |
| 2018/0121958 A1* | 5/2018 | Aist | H04W 4/021 |
| 2021/0061279 A1* | 3/2021 | Nagata | B60W 10/02 |

* cited by examiner

METHOD AND SYSTEM FOR PROVIDING ASSISTANCE TO A VEHICLE OR DRIVER THEREOF

TECHNOLOGICAL FIELD

The present disclosure generally relates to a system and method for providing assistance to a driver of a vehicle or the vehicle itself, and more particularly relates to a system and method for implementing geo-fences for providing assistance or guidance.

BACKGROUND

Currently with traditional vehicles, a vehicle operator has full control of all vehicle maneuvers. The vehicle operator can choose to make a maneuver viewed as aggressive for the vehicle which could potentially even result in an accident, thus not only risking his or her own safety and the vehicle's occupants, but also that of pedestrians and occupants of other vehicles in the vicinity. The traditional vehicles have no means to assist the driver to prevent such aggressive maneuver. Many car manufacturers are developing autonomous vehicles, which could potentially eliminate such aggressive maneuvers by disqualifying the vehicle operator to drive. However, the implementation of completely autonomous vehicles still has a lengthy transition period as the vehicles evolve from user controlled vehicles to entirely autonomous vehicles, and even autonomous vehicle may need to provide more guidance information to passengers.

BRIEF SUMMARY

In light of the above-discussed problems, there is a need to provide means for current vehicles to assist a driver, especially when driving in accident-prone geo-locations, until the time autonomous vehicles are fully developed. This will necessitate a number of solutions and improvements to vehicle control handoff and user safety issues. This also addresses both physical and psychological issues of a driver ceding operational control to the vehicle.

In one example embodiment, a method for providing assistance to a driver of a vehicle is provided. The method may include displaying one or more geo-fences super-imposed on a map display for a vehicle, wherein the one or more geo-fences comprises a tolerance zone. The method may further include identifying a driving maneuver profile for the vehicle associated with the one or more geo-fences. Additionally, the method may include displaying the driving maneuver profile on the map display, wherein displaying the driving maneuver profile comprises: displaying a distance of the vehicle from the tolerance zone; and displaying a prohibited maneuver for the vehicle based on the one or more geo-fences and the distance of the vehicle from the tolerance zone.

In some example embodiments, a system for driver assistance in a vehicle is provided. The system comprises a display module configured to display one or more geo-fences super-imposed on a map display, wherein the one or more geo-fences comprise a tolerance zone. The system further comprises at least one processor. The system further comprises at least one memory including computer program code for one or more programs, the at least one memory and the computer program code configured to, with the at least one processor, cause the driver assistance system to perform at least the following: identify a driving maneuver profile for the vehicle associated with the one or more geo-fences. The computer program code including program code to further cause the system to: display the driving maneuver profile on the map display, wherein to display the driving maneuver profile, display module is further caused to: display a distance of the vehicle from the tolerance zone; and display a prohibited maneuver for the vehicle based on the one or more geo-fences and the distance of the vehicle from the tolerance zone.

In yet another aspect, a computer program product is provided. The computer program product comprises at least one non-transitory computer-readable storage medium having computer-executable program code instructions stored therein. The computer-executable program code instructions comprising program code instructions to display one or more geo-fences super-imposed on a map display for a vehicle. The computer-executable program code instructions further comprising program code instructions to identify a driving maneuver profile for the vehicle associated with the one or more geo-fences wherein a deviation of the vehicle from the one or more geo-fences causes autonomous execution of one or more maneuvers of the vehicle to substantially mitigate deviation between the driving maneuver profile and the one or more geo-fences. The one or more geo-fences may be associated with a tolerance demarcation of deviation, wherein the tolerance demarcation provides an area with respect to the one or more geo-fences for the vehicle to deviate without causing the autonomous execution.

The methods and systems disclosed herein provide for improved driving assistance which may also help boost a driver's confidence while driving and thus, would be effective in preventing potential accident situations. For example, a geo-fence may enable the driver to gain more confidence in their planned driving maneuver by validating the driver's planned driving action on the display, as the correct driving maneuver and not a prohibited maneuver. Such as in a case where a driver passes a truck and feels under confident to accelerate or merge fast ahead, the driving assistance system may display the maneuver of accelerating as correct, by not categorizing it as a prohibited maneuver. Thus, the driver may now feel more confident while accelerating as their planned maneuver would seem validated by the driving assistance system. Such driver confidence may also be beneficial in avoiding many accident situations, thus providing enhanced safety while driving, for both, the vehicles in vicinity of the vehicle including the driving assistance system, and for pedestrians as well.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
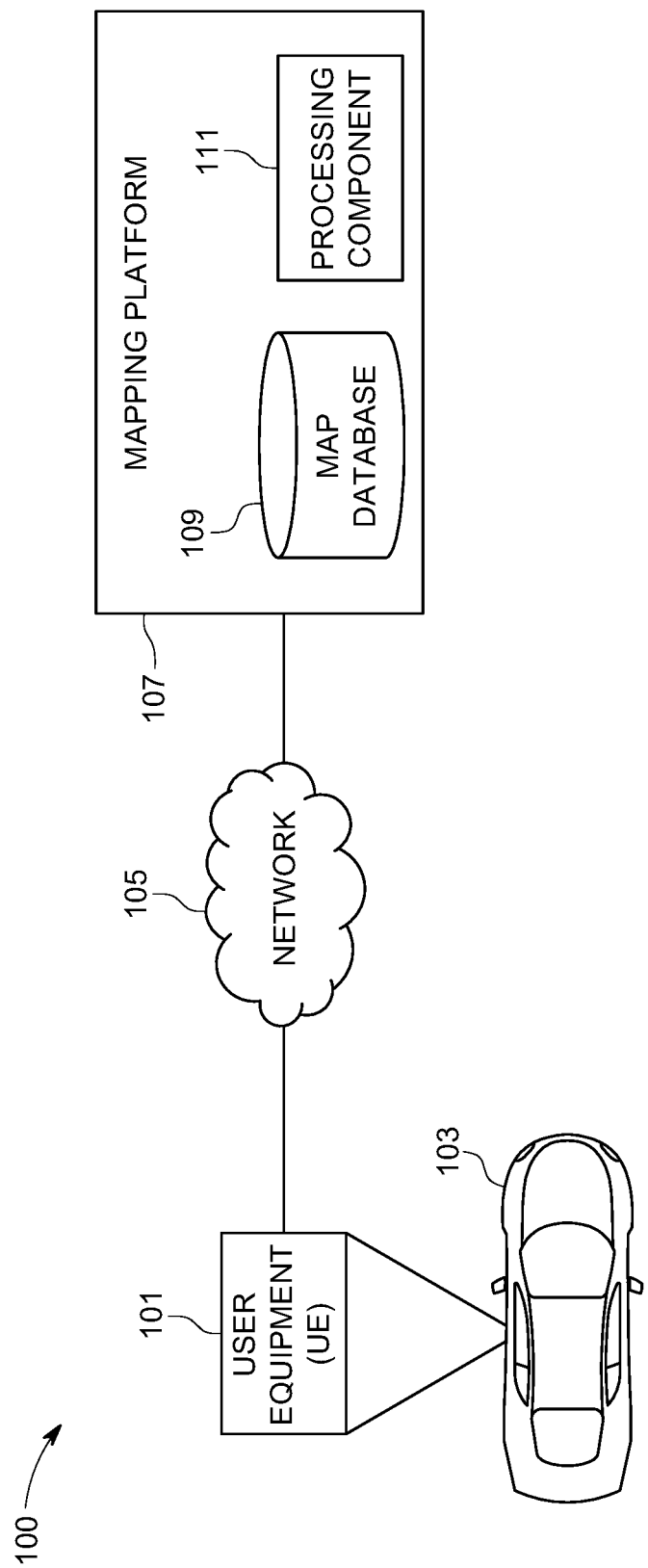
Figure 2:
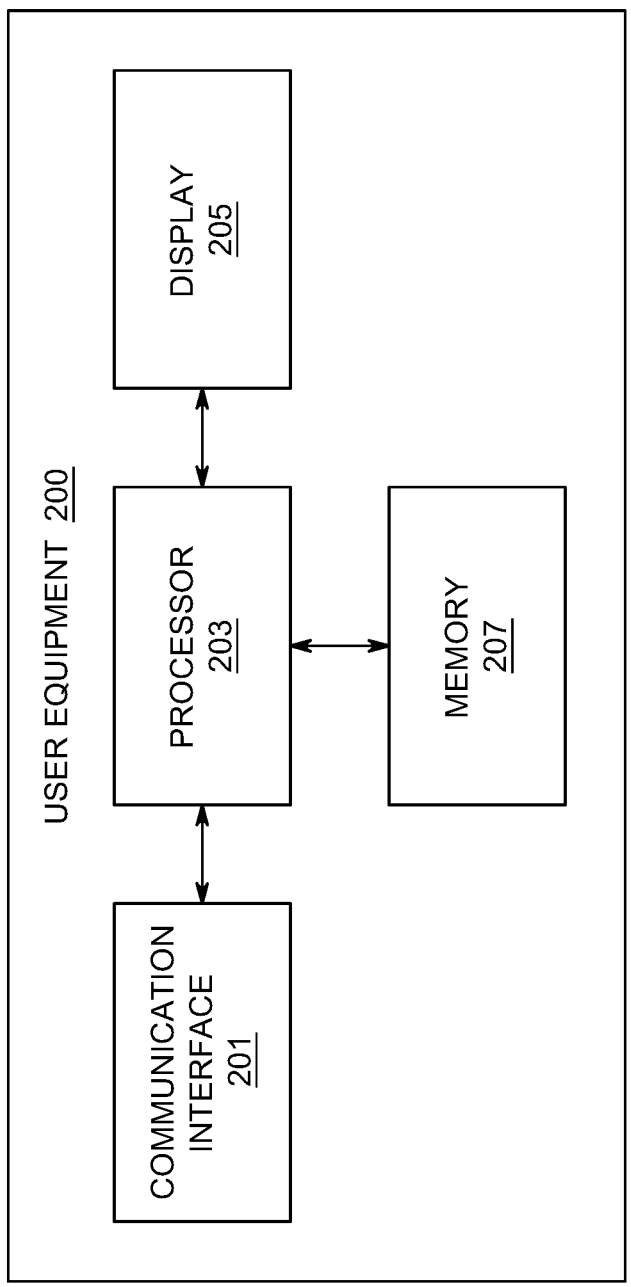
Figure 3:
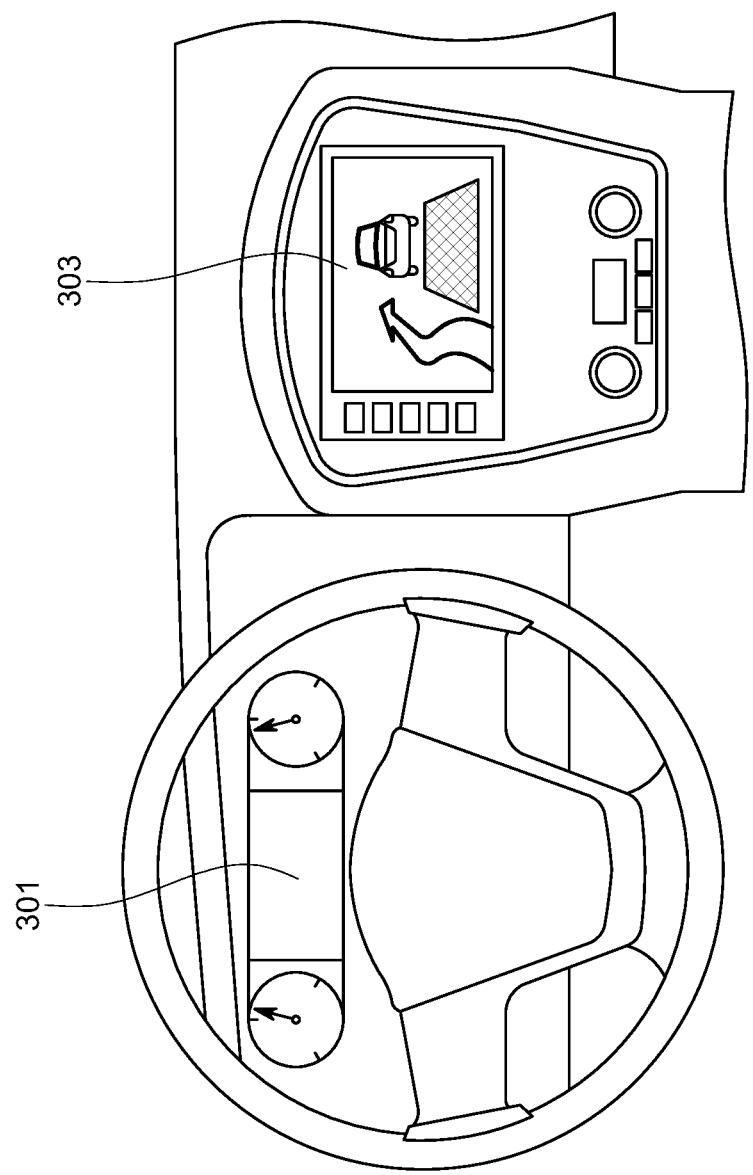
Figure 4:
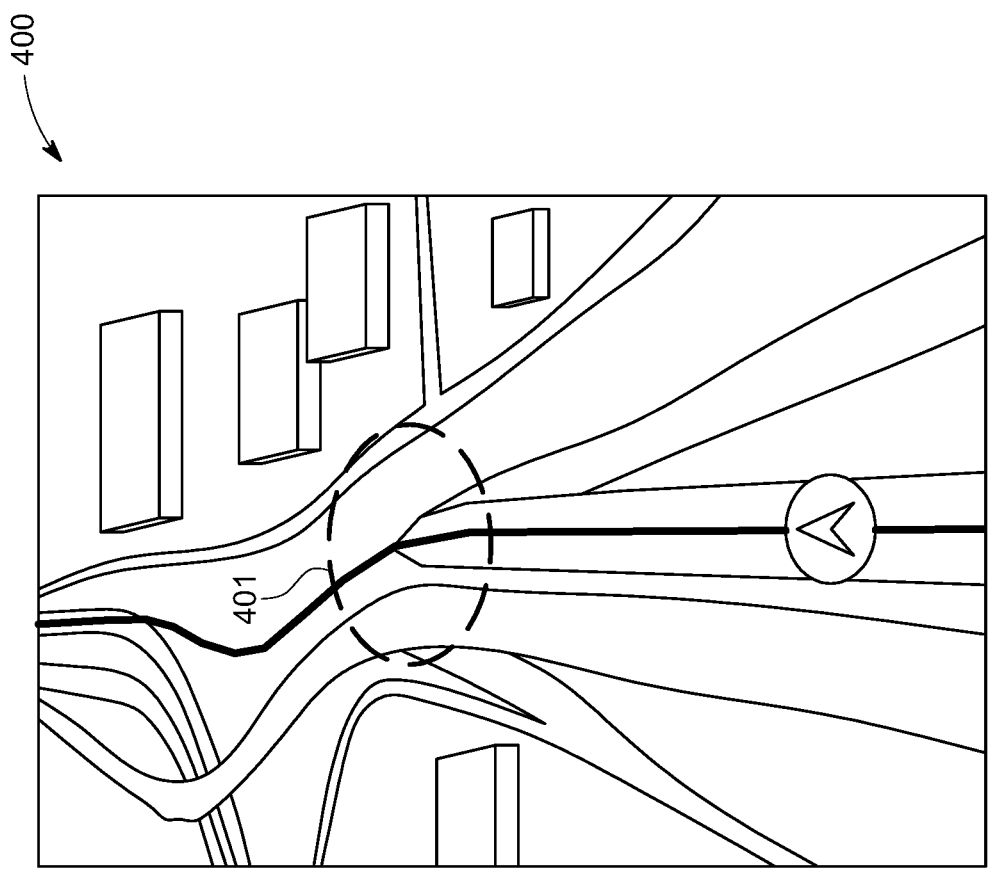
Figure 5:
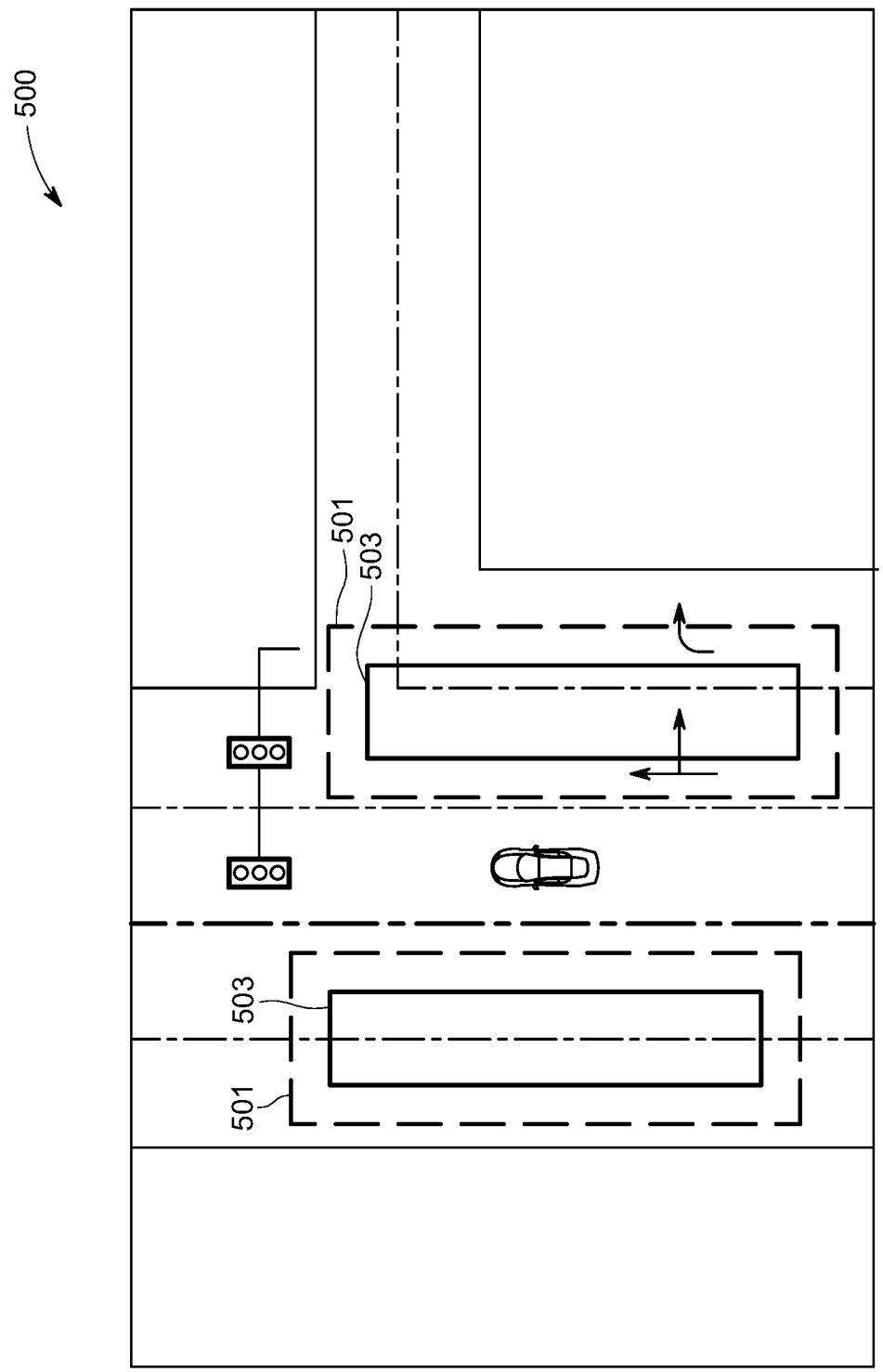
Figure 6:
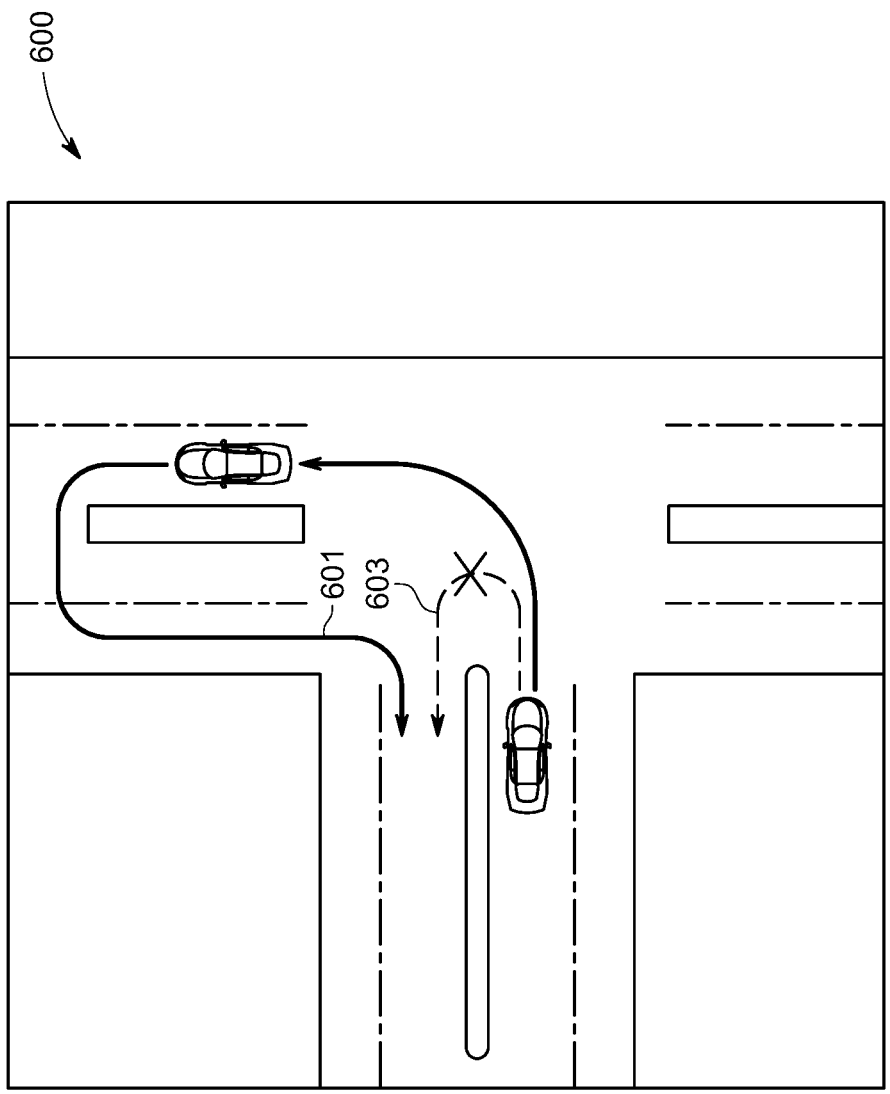
Figure 7:
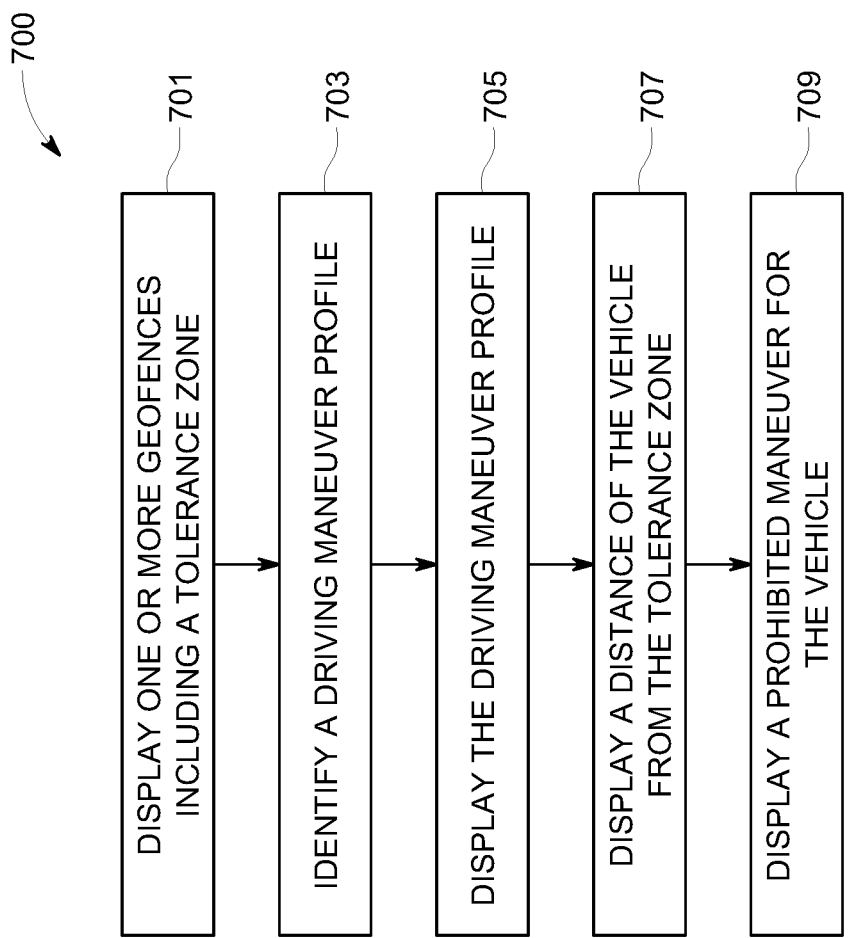
Figure 8:
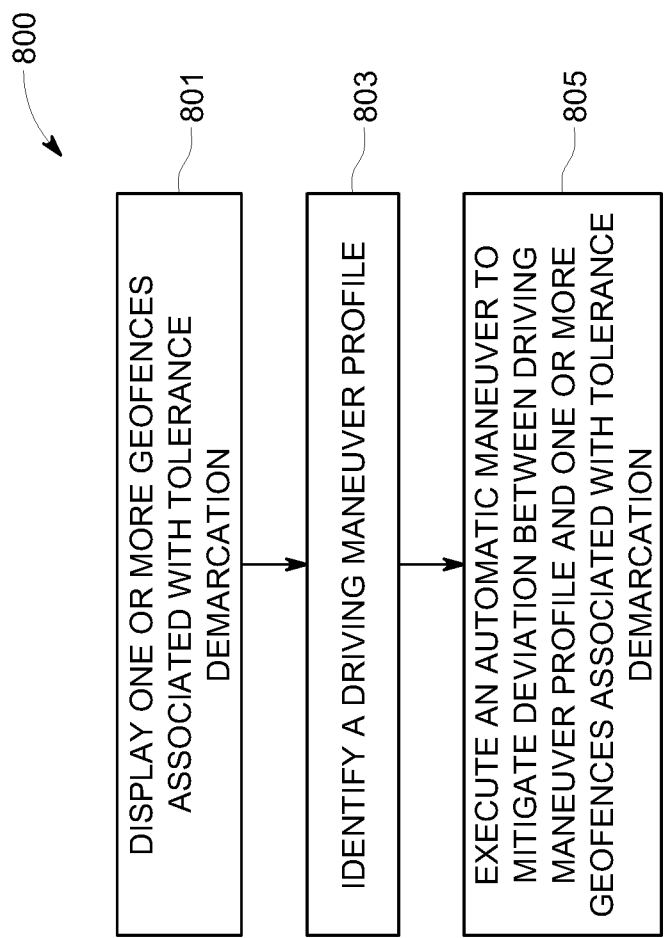

Having thus described example embodiments of the invention in general terms, reference will now be made to the accompanying drawings, which are not necessarily drawn to scale, and wherein:

FIG. 1 illustrates a block diagram of a system for providing driving assistance on a map display in accordance with an example embodiment;

FIG. 2 illustrates an block diagram of an apparatus for providing a map display in a vehicle in accordance with an example embodiment;

FIG. 3 illustrates an exemplary apparatus for displaying one or more geo-fences on a map display in a vehicle according to an example embodiment;

FIG. 4 illustrates a map interface displaying one or more geo-fences according to an example embodiment;

FIG. 5 illustrates a map interface displaying a visualization of one or more geo-fences and tolerance zone according to an example embodiment;

FIG. 6 illustrates a map interface displaying another visualization of one or more geo-fences and tolerance zone according to an example embodiment;

FIG. 7 illustrates a flow diagram of a method for providing driving assistance in a vehicle based on one or more geo-fences according to an example embodiment; and FIG. 8 illustrates a flow diagram of another method for providing driving assistance in a vehicle based on one or more geo-fences according to an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference, numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus, and computer program product are provided herein in accordance with an example embodiment for providing driving assistance in a vehicle including a map display showing one or more geo-fences. A geo-fence may be used to implement a boundary defining prohibited region of navigation for a vehicle. For example, for a vehicle navigating on a road that has an accident ahead on the route of navigation, a geo-fence may define a boundary around the accident area, which may be the prohibited region for the vehicle to enter. The boundary represented by the geo-fence may be displayed on a map display, such as of an advanced driver assistance system (ADAS) installed in the vehicle. In some embodiments, the boundary defined by the geo-fence may be used to control a driving maneuver in a vehicle, such as in a semi-autonomous or a fully autonomous vehicle. In the semi-autonomous or a fully autonomous vehicle, the control of driving maneuver may be used to implement a navigation maneuver based on the direction of navigation of the semi-autonomous or a fully autonomous vehicle, and the boundary defined by the geo-fence. Such control of driving maneuver may be specifically beneficial in situations involving vehicle operators who are trying to make an aggressive driving maneuver, which may lead to accidents. Thus, such a control may provide accident risk minimization by restricting the vehicle operator from making the aggressive driving maneuver. Thus, using the driving assistance methods and systems disclosed in the embodiments described herein may provide restrictions on aggressive driving behavior, which is a major cause of accidents on roads.

FIG. 1 illustrates a block diagram of a system for providing driving assistance on a map display in accordance with an example embodiment. The system 100 of FIG. 1 includes a user equipment 101 installed in a vehicle 103, which may be connected to a mapping platform 107 over a network.

The network 105 may be wired, wireless, or any combination of wired and wireless communication networks, such as cellular, Wi-Fi, internet, local area networks, or the like.

The user equipment 101 may be a navigation system, such as an advanced driver assistance system (ADAS), that may be configured to provide route guidance and navigation related functions to the user of the vehicle 103. The user equipment 101 may also be configured to provide a display of one or more geo-fences indicating a boundary for prohibited driving maneuvers for the vehicle 103 in accordance with the example embodiments disclosed herein.

In some example embodiments, the user equipment 101 may include a mobile computing device such as a laptop computer, tablet computer, mobile phone, smart phone, navigation unit, personal data assistant, watch, camera, or the like. Additionally or alternatively, the user equipment 101 may be a fixed computing device, such as a personal computer, computer workstation, kiosk, office terminal computer or system, or the like. The user equipment 101 may be configured to access the mapping platform 107 via a processing component 111 through, for example, a mapping application, such that the user equipment 101 may provide navigational assistance to a user in preventing aggressive driving maneuvers among other services provided through access to the mapping platform 107.

The mapping platform 107 may include a map database 109, which may include node data, road segment data or link data, point of interest (POI) data, or the like. The map database 109 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 109 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 109 can include data about the POIs and their respective locations in the POI records. The map database 109 may additionally include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 109 can include event data (e.g., traffic incidents, construction activities, scheduled events, unscheduled events, accidents, diversions etc.) associated with the POI data records or other records of the map database 109 associated with the mapping platform 107.

A content provider e.g., a map developer may maintain the mapping platform 107. By way of example, the map developer can collect geographic data to generate and enhance mapping platform 107. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Crowdsourcing of geographic map data can also be employed to generate, substantiate, or update map data. For example, sensor data from a plurality of data probes, which may be, for example, vehicles traveling along a road network or within a venue, may be gathered and fused to infer an accurate map of an environment in which the data probes are moving. The sensor data may be from any sensor that can inform a map database of features within an environment that are appropriate for mapping. For example, motion sensors, inertia sensors, image capture sensors, proximity sensors, LIDAR (light detection and ranging) sensors, ultrasonic sensors etc. The gathering of large quantities of crowd-sourced data may facilitate the accurate modeling and mapping of an environment, whether it is a road segment or the interior of a multi-level parking structure. Also, remote sensing, such as aerial or satellite photography, can be used to generate map geometries directly or through machine learning as described herein.

The map database 109 of the mapping platform 107 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, driving maneuver related functions and other functions, by a navigation device, such as by user equipment 101, for example. Further, data may be compiled relating to one or more geo-fences, movement of vehicles within lanes between different data compilation events and the like along different road segments of the map database 109, where a geo-fence estimation may be generated in dependence of time of day, day of week, season of the year, special events, etc. The map database 109 may also include data about one or more tolerance zones, and tolerance demarcation areas of deviation for a vehicle based on region-wise prescribed lane distances and the like. The navigation-related functions can correspond to vehicle navigation, pedestrian navigation, and vehicle lane changing maneuvers, vehicle navigation towards one or more geo-fences, navigation to a favored parking spot or other types of navigation. While example embodiments described herein generally relate to vehicular travel and parking along roads, example embodiments may be implemented for bicycle travel along bike paths and bike rack/parking availability, boat travel along maritime navigational routes including dock or boat slip availability, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

In some embodiments, the mapping platform 107 may be a master geographic database configured at a server side, but in alternate embodiments, a client side-mapping platform 107 may represent a compiled navigation database that may be used in or with end user devices (e.g., user equipment 101) to provide navigation and/or map-related functions. For example, the mapping platform 107 may be used with the end user device 101 to provide an end user with navigation features. In such a case, the mapping platform 107 can be downloaded or stored on the end user device (user equipment 101) which can access the mapping platform 107 through a wireless or wired connection, over the network 105. This may be of particular benefit when used for navigating within spaces that may not have provisions for network connectivity or may have poor network connectivity, such as an indoor parking facility, a remote street near a residential area and the like. As many parking facilities are multi-level concrete and steel structures, network connectivity and global positioning satellite availability may be low or non-existent. In such cases, locally stored data of the mapping platform 107 regarding the parking spaces may be beneficial as identification of suitable parking spot in the parking space could be performed without requiring connection to a network or a positioning system. In such an embodiment, various other positioning methods could be used to provide vehicle reference position within the parking facility, such as inertial measuring units, vehicle wheel sensors, compass, radio positioning means, etc.

In one embodiment, the end user device or user equipment 101 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the user equipment 101 for navigation and map functions such as guidance and map display, for example, and for determination of one or more personalized routes or route segments, visualization of one or more geo-fences and tolerance zones, identifying a vehicle driving profile based on one or more calculated and recorded vehicle parameters such as speed, direction of travel, distance from one or more geo-fences and tolerance zones, according to some example embodiments. The user equipment 101 may include an application that may enable the user to access the mapping platform 107 for availing the functions disclosed above.

FIG. 2 illustrates a block diagram of an apparatus for providing a map display in a vehicle in accordance with an example embodiment. The apparatus 200 may be such as the user equipment 101 installed in the vehicle 103, as depicted in FIG. 1. The apparatus 200, hereinafter interchangeably referred to as the user equipment 200, may include a communication interface 201 for enabling an operator to interface and control the operations of the apparatus. The communication interface 201 may include one or more of a button, a knob, a dial, a touch interface, a keyboard, a joystick, a stylus, a scroll button, a slider, keypad, mouse, stylist pen, trackball, rocker switch, voice recognition circuit, or other device or component for controlling or inputting data in one or more of the components of the apparatus 200.

The one or more functions of the apparatus 200 may include such as a brightness control function, a volume control function, a mode change function, a zooming function, a scrolling function, a selection function, a color or contrast adjustment function, a turn on or turn off function and the like.

The apparatus 200 may further include a processor 203 for performing one or more processing related functions, such as for displaying a driving maneuver profile of the vehicle 103, identifying one or more geo-fences, identifying a tolerance zone and a prohibited vehicle maneuver based on one or more geo-fences. In some example embodiments, the processor 203 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 203 may include one or more processing cores configured to perform independently. A multi-core processor may enable multiprocessing within a single physical package. Additionally or alternatively, the processor 203 may include one or more processors configured in tandem via the bus to enable independent execution of instructions, pipelining and/or multithreading.

The apparatus 200 may also include a display 205 for displaying the one or more geo-fences and a tolerance zone. In some example embodiments, the display 205 may provide a display of a map for showing the one or more geo-fences associated with the tolerance zone. The display 205 may also provide a visualization of a driving maneuver profile of the vehicle. The display 205 may further be configured to provide a visualization of one or more prohibited vehicle maneuvers based on the one or more geo-fences and a distance of the vehicle 103 from the tolerance zone associated with the one or more geo-fences. In some example embodiments, the display 205 may also be configured to display a distance of the vehicle 103 from the tolerance zone.

In some example embodiments, the display 205 may be any mechanical and/or electronic display positioned for accessible viewing in, on, or in communication with the apparatus 200. For example, the display 205 may be a touch screen, liquid crystal display ("LCD"), cathode ray tube ("CRT") display, a plasma display, or other display. The display 205 may act as a hardware implementation of a user interface or a portion thereof. The display 205 may be configured for providing visualization of one or more geo-fences on a map interface, such as of map derived from the mapping platform 107.

The apparatus 200 may also include a memory 207 for storing data related to one or more geo-fences, data related to tolerance zone, driving maneuver profile related data, one or more algorithms for providing driving assistance in accordance with the methods and systems disclosed herein. In some examples, the memory 207 may also store data retrieved from the mapping platform 107 for performing one or more functions for providing driving assistance in accordance with the methods and systems discloses herein. The memory 207 may include both dynamic memory (e.g., RAM, magnetic disk, writable optical disk, etc.) and static memory (e.g., ROM, CD-ROM, etc.) for storing executable instructions (that when executed perform the inventive steps described herein to provide driving assistance on a map display system. The memory 207 also stores the data associated with or generated by the execution of the inventive steps.

FIG. 3 illustrates an exemplary apparatus arrangement for displaying one or more geo-fences on a map display in a vehicle according to an example embodiment. The apparatus arrangement may be such as the apparatus 200 described in conjunction with FIG. 2. The apparatus arrangement may be associated with an alarm signal indicator 301. The alarm signal indicator 301 may be configured to provide an indication regarding a prohibited driving maneuver in the vehicle 103, such as in case of a deviation of the vehicle's 103 driving maneuver profile from the one or more geo-fences. In some example embodiments, the alarm signal may be a visual alarm, such as a blinking LED, display of a red color on the alarm signal indicator 301, and the like.

In some example embodiments, the alarm signal may be an audio alarm, such as a siren, a beep, a honking and the like.

The alarm signal may be generated to draw an operator's attention towards an aggressive driver maneuver that they may be trying to implement. In some examples, such as in the case of semi-autonomous or fully-autonomous vehicles, the alarm signal may indicate a restrictive driver maneuver that the apparatus 200 may implement, by taking control of the vehicle 103, to prevent an aggressive driving maneuver. The aggressive driving maneuver may include such as a prohibited driving action such as at least one route navigation action, at least one steering action and the like. The alarm signal may be generated to indicate the prohibited driving action for the vehicle.

The apparatus 300 may also include a display 303 for displaying one or more geo-fences and a tolerance zone associated with the one or more geo-fences. For example, the display 303 may represent one or more geo-fences with a first boundary line, such as having a red color. Further, the display 303 may represent the tolerance zone associated with the one or more geo-fences with a second boundary line, such as in green color. The one or more geo-fences may be displayed on the map display, such as the display 303 which may include a map interface in some example embodiments.

FIG. 4 illustrates a map interface 400 displaying one or more geo-fences according to an example embodiment. The interface 400 displays a map showing a current location of the vehicle, a route of navigation of the vehicle and a geo-fence 401 appearing in a forward navigation path of the vehicle. The geo-fence 401 may be related to such as an accident on the path ahead, an exit ramp ahead, some debris or pothole ahead, and the like. The geo-fence 401 may be represented by first a boundary line, such as a dotted line, depicting an area prohibited for entering.

In some example embodiments, the geo-fence 401 may be derived based by a temporary decision point, such as a debris or pothole on the road, an accident, a damage or catastrophe on the road and the like.

In some example embodiments, the geo-fence 401 may be derived based on a permanent decision point, such as an exit ramp. Such a permanent geo-fence may be defined based on such as markings on the road, speed limit signs such as minimum speed limit sign and/or maximum speed limit sign, region wise prescribed safe distance between vehicles, prohibited direction of travel such as right overtake or left overtake and the like.

In some example embodiments, the geo-fence 401 may be derived based on a dynamic decision point, such as a geo-fence that would adjust in size based on real time input.

For example, a vehicle may have more room to maneuver into an adjacent lane based on size of vehicle, for example, a sub compact versus semi-truck. Another example, a vehicle coming up to bicyclist on a two lane road. In some examples, dynamic geo-fences may be based on state level mandates. For example, in Illinois, a vehicle can move not closer than 3 ft of a cyclist. Thus, an oncoming vehicle will be prevented from passing by the vehicle and not allowing the driver to steer into the oncoming lane. This would also work for passing a vehicle on a two-lane road. Such an example may be illustrated by the interface of FIG. 5.

FIG. 5 illustrates a map interface 500 displaying a visualization of one or more geo-fences 503 and tolerance zone 501 according to an example embodiment. The solid line represents the permanent geo-fence 503 and the dotted line represents the tolerance demarcation 501, also interchangeable referred to as the tolerance zone.

If a vehicle, such as the vehicle 103 is travelling on a multi-lane road, the geo-fence 503 may represent the boundary line that the vehicle may be absolutely not allowed to cross in terms of deviation into adjacent lane. The tolerance demarcation 501 on the other hand may represent the maximum distance or area that the vehicle may be allowed to deviate into the adjacent lane, before being prohibited from moving further. If the vehicle tries to deviate further than the area specified by the tolerance demarcation 501, a display indicating that the vehicle is trying to perform a prohibited maneuver may be generated.

In some example embodiments, the display may also indicate distance values of the tolerance demarcation zone 501 and the geo-fence 503 from the vehicle based on vehicles current driving maneuver profile and forward path of travel of the vehicle.

In some example embodiments, the driving maneuver profile of the vehicle may be automatically adjusted based on the deviation of the vehicle from the one or more geo-fences 503 and distance of the vehicle from the tolerance demarcation zone 501.

In some example embodiments, the driving maneuver profile may be created based on one or more attributes of the vehicle, wherein the one or more attributes of the vehicle may include such as one or more of size, shape and type of the vehicle.

In some example embodiments, the driving maneuver profile may be created based on real-time data about driving of the vehicle. The real-time data may include such as one or more of current speed, current acceleration, current load, current driving gear, current driving lane and current direction of travel of the vehicle.

In some example embodiments, the driving maneuver profile may be created based on information about conditions on route of the vehicle. The conditions on the route of the vehicle may include such as one or more of potential hazards on road, accident situation and weather information on the route of the vehicle.

The driving maneuver profile and the one or more geo-fences 503 may be displayed in various different implementations, as may be understood by a person of ordinary skill in the art.

FIG. 6 illustrates a map interface 600 displaying another visualization of one or more geo-fences and tolerance zone according to an example embodiment. The display of FIG. 6 illustrates allowed 601 and prohibited 603 maneuvers by solid and dashed lines respectively.

FIG. 7 illustrates a flow diagram of a method for providing driving assistance in a vehicle based on one or more geo-fences according to an example embodiment. The method 700 of FIG. 7 includes, at 701, displaying one or more geo-fences, such as on a map display. The map display may correspond to such as the display 205 of the apparatus 200 installed in the vehicle 103. The one or more geo-fences may associate with a tolerance zone. The tolerance zone may define a maximum distance until which a vehicle may be able to navigate closer to one or more geo-fences, without performing one or more prohibited maneuvers. The prohibited maneuvers may be configured to prohibit the driver from taking an action if a vehicle is in wrong lane or position. The one or more geo-fences may derive based on using either a permanent, dynamic or temporary decision point of zone. For example, a car cannot veer more than a specified distance outside of its lane. The vehicle operator could still manually maneuver the vehicle and drive a specified distance i.e. 12 inches into the adjacent lane, but the vehicle would not allow a maneuver any further into the lane the specified 12 inches. In this case, the decision point of zone, 12 inches into the adjacent lane, serves as the tolerance zone. Once the geo-fence and tolerance zone are displayed, the method 700 may further include, at 703, identifying a driving maneuver profile for the vehicle 103. In some example embodiments, the driving maneuver profile may be an indication of a current state of the vehicle 103. The driving maneuver profile may be identified based on vehicle-derived information. Such information may include such as information related to vehicles in vicinity along with size, speed of vehicles in vicinity and road conditions. The driving maneuver profile may also include information related to current geo-location of the vehicle, such as which lane the vehicle is currently located on the road. Further, the driving maneuver profile may also include information related environmental factors in the immediate surroundings of the vehicle 103, such as debris or pothole information. Such an information may be collected from a vehicle farther ahead on the road and shared with trailing vehicles, or may be collected based on probe information i.e. camera identifies debris or pothole in road, or based on maneuver information. Once the driving maneuver profile is identified in this way, the method 700 may further include, at 705, displaying the driving maneuver profile and the one or more geo-fences. Displaying the driving maneuver profile may further include, at 707, displaying a distance of the vehicle from the tolerance zone associated with the one or more geo-fences. Based on the distance of the vehicle from the tolerance zone, the vehicle may prohibit from performing certain maneuvers, which may be considered aggressive maneuvers, based on the identified geo-fences. At 709, such prohibited maneuvers may be displayed on the map display. Such a display may include such as the display 600 showing allowed and prohibited maneuvers. In some example embodiments, such a display may include an icon showing the type of maneuver. In some example embodiments, such a display may include an animation displaying the maneuvers that can and/or cannot occur. In some example embodiments, such prohibited maneuvers may be identified based on a distance of the vehicle 103 from the tolerance zone. In some examples, the vehicle 103 may be a semi-autonomous vehicle.

FIG. 8 illustrates a flow diagram of another method for providing driving assistance in a vehicle based on one or more geo-fences according to an example embodiment, such as in a semi-autonomous vehicle. The method 800 may include, at 801, displaying one or more geo-fences associated with a tolerance demarcation, such as a tolerance zone. For example, the one or more geo-fences 503 displayed in the map display 500 illustrated in FIG. 5. The map display 500 may also display a tolerance zone 501, such that the tolerance zone 501 may illustrate the maximum distance that the vehicle may be allowed to deviate towards the one or more geo-fences 503. In some examples, the map display 500 may also display the distance of the tolerance zone 501 and the one or more geo-fences 503 from the vehicle.

The method 800 may further include, at 803, identifying a driving maneuver profile for the vehicle 103. The driving maneuver profile of the vehicle may be identified based on real time vehicle data such as current speed, current acceleration, current load, current driving gear, current driving lane and current direction of travel of the vehicle. The driving maneuver profile may also be identified based on information about conditions on route of the vehicle, such as one or more of potential hazards on road, accident situation and weather information on the route of the vehicle, pothole on the road, debris on the road and the like. The method 800 may further include, at 805, executing an automatic maneuver to mitigate a deviation between the driving maneuver profile and one or more geo-fences associated with the tolerance demarcation. For example, if a vehicle is trying to deviate too close to a vehicle in an adjacent lane, which may be even closer than the distance defined by the tolerance zone, the deviation may be prohibited by steering the vehicle away from the adjacent lane vehicle automatically. This may help in improving safety of the passengers and adjacent vehicles travelling on the road, as well as boost driver confidence, especially in case of semi-autonomous vehicles.

In an example embodiment, an apparatus for performing the methods 700 and 800 of FIGS. 7 and 8 above may comprise a processor (e.g. the processor 203) configured to perform some or each of the operations of the methods FIG. 7 and FIG. 8 described previously. The processor may, for example, be configured to perform the operations (701-703) and (801-803) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (701-703) and (801-803) may comprise, for example, the processor 203 which may be implemented in the user equipment 101 and/or a device or circuit for executing instructions or executing an algorithm for processing information as described above.

The same implementation can obviously be duplicated to many other driving maneuvers and restrictions, allowing implementation of semi-autonomous or fully autonomous functionality in vehicles.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for providing assistance to a driver of a vehicle, the method comprising:
    displaying one or more geo-fences super-imposed on a map display of a mobile computing device onboard a vehicle, wherein the one or more geo-fences comprises a tolerance zone;
    identifying a driving maneuver profile for the vehicle associated with the one or more geo-fences;
    displaying the driving maneuver profile on the map display of the mobile computing device onboard the vehicle, wherein displaying the driving maneuver profile comprises:
        displaying a distance of the vehicle from the tolerance zone; and
        displaying a prohibited maneuver for the vehicle based on the one or more geofences and the distance of the vehicle from the tolerance zone;
    determining one or more maneuvers to be taken by the vehicle to mitigate deviation between the driving maneuver profile and the prohibited maneuver; and
    instructing the vehicle to autonomously execute the determined one or more maneuvers.

2. The method of claim 1, wherein displaying the one or more geo-fences comprises displaying a first boundary line on the map display for displaying the one or more geo-fences and displaying a second boundary line on the map display for displaying the tolerance zone.

3. The method of claim 2, wherein a distance of the second boundary line from the vehicle indicates the maximum distance of travel allowed for the vehicle in a direction of the one or more geo-fences.

4. The method of claim 1, wherein displaying a prohibited maneuver for the vehicle comprises providing data for an alarm signal indicating a prohibited action for the vehicle based on the one or more geo-fences and the distance of the vehicle from the tolerance zone.

5. The method of claim 4, wherein the prohibited action includes at least in part, at least one driving action, at least one route navigation action, at least one steering action, or a combination thereof.

6. The method of claim 4, wherein providing data for an alarm signal comprises providing an audio data for providing the alarm signal indicating the prohibited action for the vehicle.

7. The method of claim 4, wherein providing data for an alarm signal comprises providing a visual data for providing the alarm signal indicating the prohibited action for the vehicle.

8. The method of claim 1, wherein displaying one or more geo-fences super-imposed on a map display comprises displaying one or more geo-fences on a forward path in a direction of travel on a route of navigation of the vehicle.

9. The method of claim 1, wherein the driving maneuver profile is created based on one or more attributes of the vehicle, wherein the one or more attributes of the vehicle comprise one or more of size, shape and type of the vehicle.

10. The method of claim 1, wherein the driving maneuver profile is created based on real-time data about driving of the vehicle, and wherein the real-time data comprises one or more of current speed, current acceleration, current load, current driving gear, current driving lane and current direction of travel of the vehicle.

11. The method of claim 1, wherein the driving maneuver profile is created based on information about conditions on route of the vehicle, and wherein the conditions on route comprise one or more of potential hazards on road, accident situation and weather information on the route of the vehicle.

12. The method of claim 1, wherein the one or more geo-fences are permanently defined for the vehicle based on road markings, maximum speed limit, minimum speed limit, minimum safe distance to be maintained between vehicles, and prohibited direction of travel.

13. The method of claim 1, wherein the one or more geo-fences are temporarily defined for the vehicle based on one or more time-sensitive situations, including an accident, road damage and road blockage, for a route of navigation of the vehicle.

14. The method of claim 1, wherein the one or more geo-fences are dynamically defined, in real time, for the vehicle based on real time input about vehicle status, near-by vehicles movements and road conditions, for a route of navigation of the vehicle.

15. A driver assistance system for a vehicle, the driver assistance system comprising:
    a display module configured to display one or more geo-fences super-imposed on a map display of a mobile computing device onboard the vehicle, wherein the one or more geo-fences comprise a tolerance zone;
    at least one processor; and
    at least one memory including computer program code for one or more programs,
    the at least one memory and the computer program code configured to, with the at least one processor, cause the driver assistance system to perform at least the following:
    identify a driving maneuver profile for the vehicle associated with the one or more geofences;
    display the driving maneuver profile on the map display of the mobile computing device onboard the vehicle, wherein to display the driving maneuver profile, the display module of the driver assistance system is further caused to:
        display a distance of the vehicle from the tolerance zone; and
        display a prohibited maneuver for the vehicle based on the one or more geofences and the distance of the vehicle from the tolerance zone;
    determine one or more maneuvers to be taken by the vehicle to mitigate deviation between the driving maneuver profile and the prohibited maneuver; and
    instruct the vehicle to autonomously execute the determined one or more maneuvers.

16. The system of claim 15, wherein the system is further caused to display a first boundary line on the map display for displaying the one or more geo-fences and display a second boundary line on the map display for displaying the tolerance zone.

17. The system of claim 16, wherein a distance of the second boundary line from the vehicle indicates the maximum distance of travel allowed for the vehicle in a direction of the one or more geo-fences.

18. A computer program product comprising at least one non-transitory computer-readable storage medium having computer-executable program code instructions stored therein, the computer-executable program code instructions comprising program code instructions for:
    displaying one or more geo-fences super-imposed on a map display for a vehicle; and
    identifying a driving maneuver profile for the vehicle associated with the one or more geo-fences,
    wherein a deviation of the vehicle from the one or more geo-fences causes autonomous execution of one or more maneuvers of the vehicle to substantially mitigate deviation between the driving maneuver profile and the one or more geo-fences.

19. The computer program product of claim 18, wherein the computer executable program code instructions further comprising program code instructions for:
    displaying one or more geo-fences super-imposed on a map display for a vehicle, wherein the one or more geo-fences associate with a tolerance demarcation of deviation,
    wherein the tolerance demarcation provides an area with respect to the one or more geofences for the vehicle to deviate without causing the autonomous execution.

* * * * *